Patented Aug. 10, 1954

2,686,134

UNITED STATES PATENT OFFICE 2,686,134

COATING OF WELDING ROD

Walter H. Wooding, Yeadon, and Charles T. Gayley, Lansdowne, Pa.

No Drawing. Application June 29, 1951, Serial No. 234,433

9 Claims. (Cl. 117—65)

(Granted under Title 35, U. S. Code (1952), sec. 266)

The invention described herein may be manufactured and used by or for the Government of the United States of America for governmental purposes without the payment of any royalties thereon or therefor.

The present invention concerns a composition of matter and particularly concerns a composition for coating a welding electrode for use in welding metals and alloys by the electric-arc process.

In the art of electric-arc welding it is customary to weld together pieces of metal by means of an electric arc between the metal to be welded and a welding electrode. Conventionally the welding electrode is a rod formed of suitable metallic material that deposits to form the weld. In order to facilitate the welding operation and to insure deposition of a satisfactory weld, it is customary to coat the welding rod with a flux composition.

Conventional flux coatings for welding rods have a critical disadvantage in that the coating after baking upon the rod absorbs water, whereby the rod is rendered inoperative for depositing a satisfactory weld. Conventionally also flux coatings for welding rods are not of ceramic nature and they cannot be sintered at relatively low temperatures.

The flux coating of the present invention is critically different from conventional coatings by the inclusion of lithium pentaborate or other lithium borates in small amounts preferably of the order of 0.5 to 3.0 per cent by weight. Lithium borate performs the function of permitting sintering at a relatively low temperature to form a ceramic coating. The ceramic coating reduces to an insignificant quantity the water reabsorbed by the coating. The lithium pentaborate or other lithium borates also serves as fluxing agents.

An object of the invention is to provide a composition of matter.

Another object is to provide a composition for coating a welding electrode.

Another object is to provide an electrode coating including lithium pentaborate.

Another object is to provide an electrode coating with 0.5 to 3.0 per cent, by weight, of lithium pentaborate or other lithium borates whereby the coating can be sintered at a relatively low temperature to form a ceramic coating that is resistant to the absorption of water.

Further objects and advantages of this invention as well as its ingredients and proportions thereof, are apparent from the following description.

The flux coating of the present invention includes conventional ingredients that serve conventional purposes. Feldspar is used as a flux and powdered silica is used as a slag former. Ferro-silicon and manganese metal serve as deoxidizers and as alloying agents, with ferro-silicon serving further as a slag former. Sodium silicate is used as a binder. Other conventional ingredients can be used if desired in providing the desired atmosphere for the weld to stabilize the arc, and to perform other conventional functions.

The critical departure in the present invention resides in the inclusion of lithium pentaborate or other lithium borates with the above conventional ingredients, the lithium borate being present preferably in amounts from 0.5 to 3.0 per cent by weight.

The lithium pentaborate or other lithium borates facilitates sintering to form a ceramic coating that reduces to an insignificant amount the water reabsorbed by the coating. The lithium pentaborate or other lithium borates also serve as fluxing agents.

Examples of preferred coating compositions are as follows:

*Example 1*

| | Per cent |
|---|---|
| Marble flour | 20–30 |
| Fluorspar | 15–25 |
| Titania | 2–10 |
| Feldspar | 2–10 |
| Calcium silicate | 2–10 |
| Powdered silica | 2–10 |
| Lithium pentaborate | 0.5–2.5 |
| Ferro-silicon | 2–7 |
| Manganese metal | 0–7 |
| Sodium silicate | 0–10 |
| Potassium silicate | 10–25 |

*Example 2*

| | Per cent |
|---|---|
| Marble flour | 1–5 |
| Feldspar | 25–35 |
| Powdered silica | 1–8 |
| Lithium pentaborate | 0.5–2.5 |
| Ferro-silicon | 3–10 |
| Manganese metal | 1–7 |
| Asbestos | 8–15 |
| Graphite | 1–3 |
| Manganese dioxide | 12–18 |
| Sodium silicate | 12–22 |

*Example 3*

| | Per cent |
|---|---|
| Fluorspar | 20–35 |
| Feldspar | 5–15 |
| Calcium silicate | 5–20 |
| Zinc oxide | 1– 5 |
| Lithium borate | 0.5– 4 |
| Boron bearing Pyrex glass | 5–15 |
| Ferro-silicon | 3– 8 |
| Manganese metal | 2– 7 |
| Nickel powder | 1– 9 |
| Ferro-molybdenum | 1– 6 |
| Potassium silicate glass | 4–10 |
| Potassium silicate | 9–18 |

The flux coating is made by preparing the conventional ingredients and the lithium borate in powdered or granular form. These ingredients are weighed to provide the selected proportions and are mixed in dry state. The dry mixture is dispersed in sodium silicate dissolved in water to a consistency of syrup to form a wet batch. The wet batch is applied to the electrode rod by extruding, dipping or in any other conventional manner. The coated electrodes are dried at room temperature, followed by baking in an oven or furnace at a temperature suitable to sinter the composition and provide a ceramic coating.

The coating produced with any one of the above compositions is ceramic in nature and highly resistant to the absorption of water. The lithium pentaborate or other lithium borates functions as fluxing agents and permit sintering at a relatively low temperature.

Obviously many modifications and variations of the present invention are possible in the light of the above teachings. It is therefore to be understood that within the scope of the appended claims the invention may be practiced otherwise than as specifically described.

We claim:

1. The method of fabricating a coated weld rod, said method comprising forming a coating composition including flux forming and slag forming ingredients and from 0.5% to 4.0% of lithium borate, coating a weld rod with said composition, and thereafter sintering said coating to form a ceramic composition.

2. The method defined in claim 2 wherein said lithium borate consists in lithium pentaborate.

3. The method of fabricating a coated weld rod, said method comprising forming a composition including flux forming and slag forming ingredients and from 0.5% to 4.0% of lithium borate, the melting points of said slag forming ingredients being higher than the melting point of said lithium borate, coating a weld rod with said composition, and thereafter sintering said coating.

4. The method defined in claim 3 wherein said lithium borate is lithium pentaborate.

5. The method of fabricating a coated weld rod, said method comprising forming a composition including flux forming and slag forming ingredients, sodium silicate, water, and from 0.5% to 4.0% of lithium borate, the melting points of at least some of said slag forming ingredients being higher than the melting point of said borate, coating a weld rod with said composition and thereafter sintering said coating.

6. The method defined in claim 5 wherein said lithium borate is lithium pentaborate.

7. The method of fabricating a coated weld rod, said method comprising forming a composition including flux forming and slag forming ingredients, potassium silicate, water and from 0.5% to 4.0% of lithium borate, the melting points of at least some of said slag forming ingredients being higher than the melting point of said borate, coating a weld rod with said composition and thereafter sintering said coating.

8. The method defined in claim 7 wherein said lithium borate is lithium pentaborate.

9. The method of fabricating a coated weld rod, said method comprising forming a composition including flux forming and slag forming ingredients, an alkali silicate, water and from 0.5% to 4.0% of lithium borate, the melting points of at least some of said slag forming ingredients being higher than the melting point of said borate, coating a weld rod with said composition and thereafter sintering said coating.

References Cited in the file of this patent

UNITED STATES PATENTS

| Number | Name | Date |
|---|---|---|
| 2,118,680 | Lytle | May 24, 1938 |
| 2,442,892 | Harvey | June 8, 1948 |

FOREIGN PATENTS

| Number | Country | Date |
|---|---|---|
| 285,674 | Great Britain | Feb. 23, 1928 |
| 553,170 | Great Britain | May 11, 1943 |
| 573,337 | Great Britain | Nov. 16, 1945 |
| 579,635 | Great Britain | Aug. 9, 1946 |
| 606,598 | Great Britain | Aug. 17, 1948 |
| 618,304 | Great Britain | Feb. 18, 1949 |